United States Patent
Smith et al.

(12)

(10) Patent No.: US 6,374,100 B1
(45) Date of Patent: Apr. 16, 2002

(54) METHOD AND APPARATUS FOR UPDATING A MOBILE STATION PARAMETER SET

(75) Inventors: Jeffrey D. Smith, Sunrise; Randall A. Moyers, Coral Springs; Ketan Shah, Miami, all of FL (US); Alfred A. Wieczorek, Mountain View, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/268,570

(22) Filed: Mar. 15, 1999

(51) Int. Cl.[7] ................................................ H04M 3/00
(52) U.S. Cl. ........................ 455/419; 455/432; 455/461
(58) Field of Search ............................... 455/419, 432, 455/461, 422, 426, 433, 434, 435, 445, 517, 551, 552

(56) References Cited

U.S. PATENT DOCUMENTS

| | | | | |
|---|---|---|---|---|
| 5,031,232 A | * | 7/1991 | Myaginnes | 455/67.7 |
| 5,684,859 A | * | 11/1997 | Chanroo et al. | 455/11.1 |
| 5,903,845 A | * | 5/1999 | Buhrmann et al. | 455/461 |
| 5,915,220 A | * | 6/1999 | Chelliah | 455/435 |
| 5,933,778 A | * | 8/1999 | Buhrmann et al. | 455/461 |
| 6,002,930 A | * | 12/1999 | Sadrozinski et al. | 455/432 |
| 6,047,071 A | * | 4/2000 | Shah | 380/273 |
| 6,108,540 A | * | 8/2000 | Sonti et al. | 455/433 |
| 6,128,483 A | * | 10/2000 | Doiron et al. | 455/419 |

FOREIGN PATENT DOCUMENTS

WO      WO 98/36605      *  8/1998  ............ H04Q/7/38

* cited by examiner

*Primary Examiner*—Dwayne Bost
*Assistant Examiner*—Sonny Trinh
(74) *Attorney, Agent, or Firm*—Scott M. Garrett

(57) ABSTRACT

A mobile station (102) contains a local personality database (110) in a memory (306) of the mobile station. The local personality database contains information records (400), at least one of which has a variable personality parameter, such as a directory number (404). The directory number may change with either the time of day, geographic location, or both. At the appropriate time, the mobile station transmits a request to a central office (106) to receive an update of the directory number. The central office searches a parameter database (112) to find the most recent directory number, and returns it to the mobile station, which stores it for use at a later time. The system can also update scan and channel lists in the same manner.

11 Claims, 3 Drawing Sheets

METHOD AND APPARATUS FOR UPDATING A MOBILE STATION PARAMETER SET

TECHNICAL FIELD

This invention relates in general to mobile communication systems, and more particularly to mobile communication systems in which parameters, used by the mobile station to call other parties, may change by virtue of geographic location or time of day, or both.

BACKGROUND OF THE INVENTION

Mobile communication systems have gained immense popularity in recent years, and have proven to very useful in facilitating communication between and among parties. There are a wide variety of reasons why people subscribe to mobile communication services, including, for example, convenience, in case of emergencies, and for business users to maintain contact when traveling. Indeed, mobile communication service is increasing in popularity as the cost of service decreases, and is increasingly viewed as a necessity.

One application of mobile communication that is well established is fleet and dispatch communication in large organizations. These organizations may be either public or private organizations. In many such organizations individuals are assigned communication devices. Since the cost of communication equipment has decreased so much in recent years, it is often the case that such assignments are permanent, meaning a specific individual keeps the communication device at all times, whether they are working or not. Many business organizations, for example, have given sales personnel cellular telephones. The same is true in many other fields as well. For example, is becoming routine in large business organizations for employees to use mobile communication devices to be able to contact, and perhaps more importantly, to be contacted, as conveniently as possible.

Mobile communication devices are routinely designed to store frequently called numbers, channel lists, and frequency lists. Some of these are user programmable, such as so called "speed dial" numbers. Usually these are associated with an alias so that a user can program in a name to be associated with the number for easy recognition. However, these type of parameters, generically referred to a personality parameters, are fixed. That is, once a user programs a number into the communication device and associates it with an alias, the communication device is bound to using that number. If the user knows, for example, that there are 5 different sales associates that could be on call at any given time, it is up to the user of the communication device to know, or have programmed, the number into the mobile station, and then make a determination as to which associate is presently on duty. The problem is worse if the user travels to an unfamiliar region, and does not know any of the local numbers.

The problem briefly illustrated above can be expanded to many other types of use. For example, in large manufacturing facilities there will often be several shifts during a given day, with several people taking charge of various operations at different times of day and week. If someone needs to communicate with the manager on duty in a particular department, they have to both know who the present manager on duty is, and have the manager's number, or else they will have to try a more conventional form of communication, such as a wire line telephone. However, the trend in large organizations is to provide certain employees with mobile communication devices so they will not miss important calls.

A similar situation exists with respect to geographic regions. Presently, whenever a mobile user enters a new region and desires to call the local office of a company or franchise, the user must either call directory assistance or locate the correct number in a local directory, assuming the number is published. This is a cumbersome process given the ease and speed with which modern information systems can provide the same type of information.

It would be more convenient if, instead of having the user remember or store all the various numbers into a mobile communication device, the communication system could instead provide the desired numbers according to the time of day or the geographic region, or both.

DETAILED DESCRIPTION OF A PREFERRED EMBODIMENT

Figure 1:
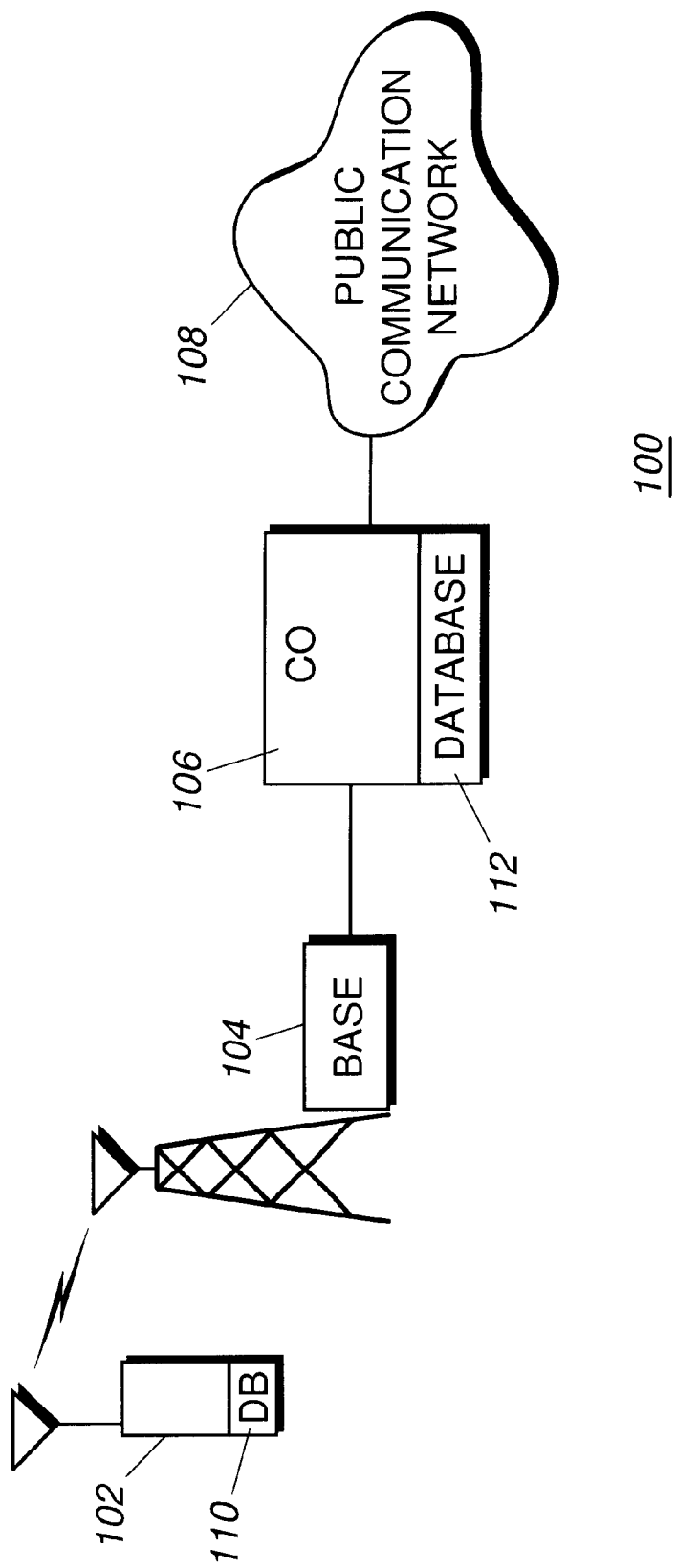
FIG. 1 shows a basic communication system diagram for use in accordance with the invention.

While the specification concludes with claims defining the features of the invention that are regarded as novel, it is believed that the invention will be better understood from a consideration of the following description in conjunction with the drawing figures, in which like reference numerals are carried forward.

The present invention solves the problem existing with present art systems by defining, in addition to fixed personality parameters, as are conventional, variable personality parameters. Personality parameters are those parameters used by the mobile communication device for performing certain functions, and may be user programmable, or auto-programmed. This would include phone numbers or other identification numbers of other parties, including other mobile users, channel lists, scan frequency lists, and so on. Variable personality parameters are associated with a fixed alias, and the actual number is updated by the system when the mobile station registers, or upon request by the mobile user.

Referring now to FIG. 1, there is shown therein a diagram of a mobile communication system 100 in accordance with the invention. There is shown a mobile station 102, a base station 104, and a central office 106. The mobile station 102 is portable communication device, such as a cellular telephone, or other similar personal radio device. The base station is one of many such base stations, typically arranged in a cellular scheme, and it establishes a serving cell in the vicinity of the base station. The base station and central office are part of a fixed equipment network that facilitate mobile communication, and permit access to other communication services such as the public switched telephone network 108.

The mobile station 102 contains a memory 110 for storing information, including personality parameters, which constitute a local personality database. Personality parameters are information records, including those typically programmed into a mobile station by the owner/user, such as call list entries. Each record is stored in a unique memory location. Call list entries include phone numbers and, for mobile stations that have dispatch communication capability, identification numbers of other users in the communication system. These entries usually correspond to a person the user of the mobile station frequently calls, or they may correspond to a particular job function within an organization, such as an on-call salesman or customer service number. As mentioned hereinabove, in prior art mobile stations these type of entries are fixed, meaning that once the number is entered, along with an associated alias name, it remains fixed unless the user edits it. By scrolling through a list displayed by the mobile station, can select the desired alias and the mobile station will retrieve and call the corresponding number.

However, according to the invention, the user, upon entering a call list entry, will be given the option of designating the entry as a fixed personality parameter, or as a variable personality parameter. A variable personality parameter is one that is automatically updated by the communication system at appropriate times so that the user does not need to have the particular number for the party he intends to communicate with. To facilitate this functionality, one of the attributes of the variable personality parameter is used as a key to signal the fixed equipment network. The key may be a unique alias, directory number, or a third value associated with the entry.

The central office 106 of the fixed equipment network includes a database 112 of variable system parameters corresponding to variable personality parameters for use by mobile stations. Basically, entries in the database are keyed to the same key used by the mobile station. When the mobile station requests an update to a specific variable personality parameter, the central office fetches the current record corresponding to the key, and transmits it to the mobile station. The mobile station then stores the information and associates it with an alias. The information transmitted changes according to the time of day, or the geographic location, and may be set up to change on a scheduled basis. The mobile station updates the entries for those variable personality parameters the user has selected on a periodic basis, and may be done, for example, during registration.

Figure 2:
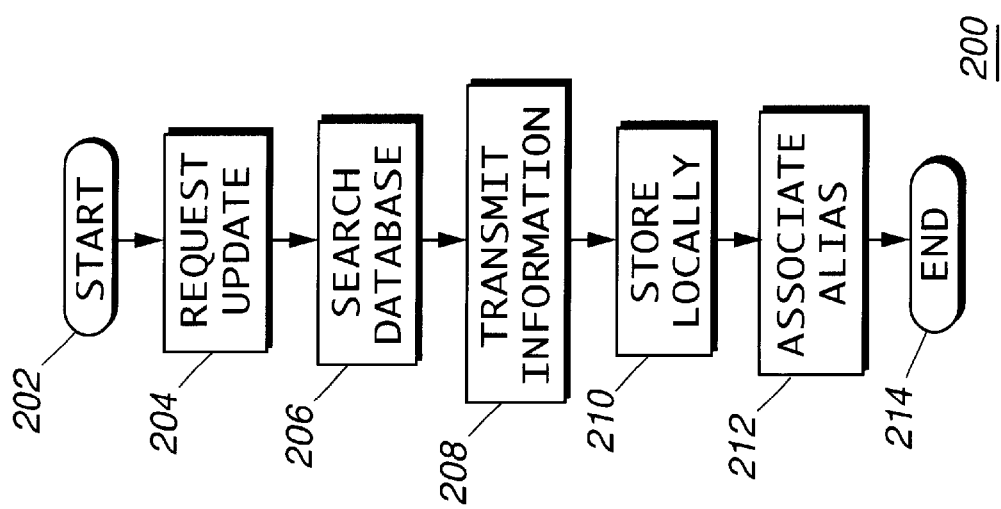
FIG. 2 shows a flow chart diagram of a preferred method for carrying out the instant invention.

The flow chart diagram of FIG. 2 illustrates how the communication system works. Referring now to FIG. 2, where there is illustrated therein a flow chart diagram 200 representing a method for updating a mobile station personality, including at least one variable personality parameter, in accordance with the invention At the start (202) of the process, the user activates the mobile station, which has already been programmed with at least one variable personality parameter by the user. The activation may be a request by the user, or it may simply occur upon turning on the mobile station and having the mobile station register for service with the fixed equipment network. The variable personality parameter will have an alias, and may already have a number associated with the alias. However, since the number may have changed by virtue of the time of day or geographic location, the next step performed is requesting (204) a personality update. The mobile station transmits a request to the central office, including the key to each variable personality parameter programmed into the mobile station. Upon receiving the request, the equipment at the central office 106 performs the step of searching (206) the database of variable system parameters 112 to find a current system parameter corresponding to each variable personality parameter for which the mobile station has sent a key. Upon locating the information, the fixed equipment network transmits (208) the information and corresponding key to the mobile station. The mobile station then performs the step of storing (210) the current system parameter in the memory location of the local personality database corresponding to the variable personality parameter, and associates (212) the proper alias with the current system parameter. Upon completion (214) of the process, the user of the mobile station may select the desired alias from a list, without regard to the actual number being called.

According to the invention, the variable system parameters stored in the database 112 are under control of the system operator. The database is administered by a computer, as is know in the art, which is co-located in the central office. The system operator establishes an account for each variable system parameter, including the information to be used for each variable system parameter, and a schedule to change the information stored in the database 112 if it is to be changed with time.

Figure 3:
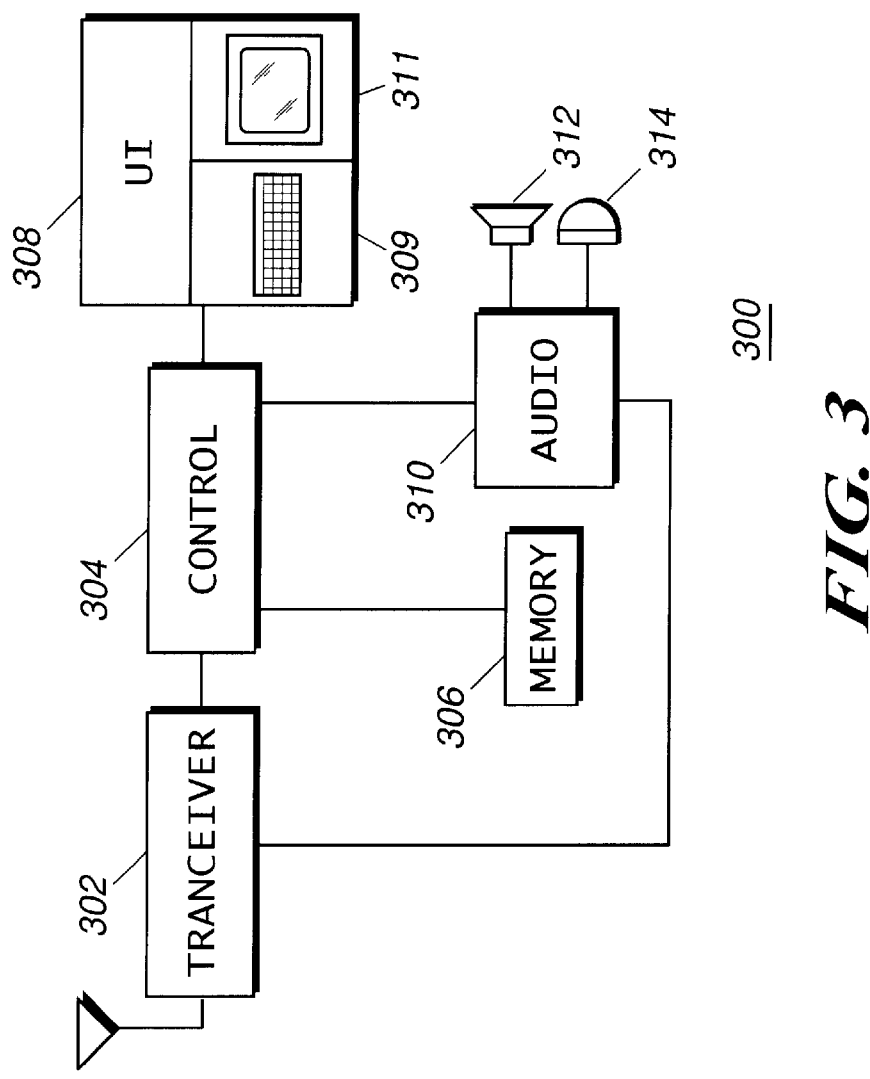
FIG. 3 shows a block diagram of a mobile communication device in accordance with the instant invention.

Referring now to FIG. 3, there is shown therein a block diagram schematic of a mobile station 300 in accordance with the invention. The mobile station comprises a radio frequency transceiver means 302, operated under control of a controller 304. The transceiver means may be any one of several well known type of transceivers, and performs the tasks of modulating signals to be transmitted and demodulating received signals. The controller provides control signals to the transceiver which select frequencies and may provide timing information for modulation schemes such as time division multiple access (TDMA). Generally, the controller includes a microprocessor, for which appropriate software instructions have been developed, and stored in a memory 306. The memory includes ROM, RAM and programmable RAM (PRAM). The permanent software instructions are stored in the ROM, RAM is used for variable storage and calculations during operation, and PRAM is used for semi-permanent information, including personality parameters. The mobile station also comprises an audio component 310, which is also controlled by the controller, and includes transducers such as a speaker 312 and a microphone 314, as are well known. In the preferred embodiment the audio component is a digital audio controller, and provides to, and receives from the transceiver, audio signals in digital form, as is known in the art. Finally, the mobile station comprises a user interface means 308. The user interface means typically includes a display 311 and a keypad 309 and associated driver circuitry and software so that the user of the mobile station can easily operate the mobile station, display numbers, and program the mobile station. In one embodiment of the invention, the user of the mobile station can enter a command by using the keypad. The command causes the mobile station to perform the personality update at that time.

Figure 4:
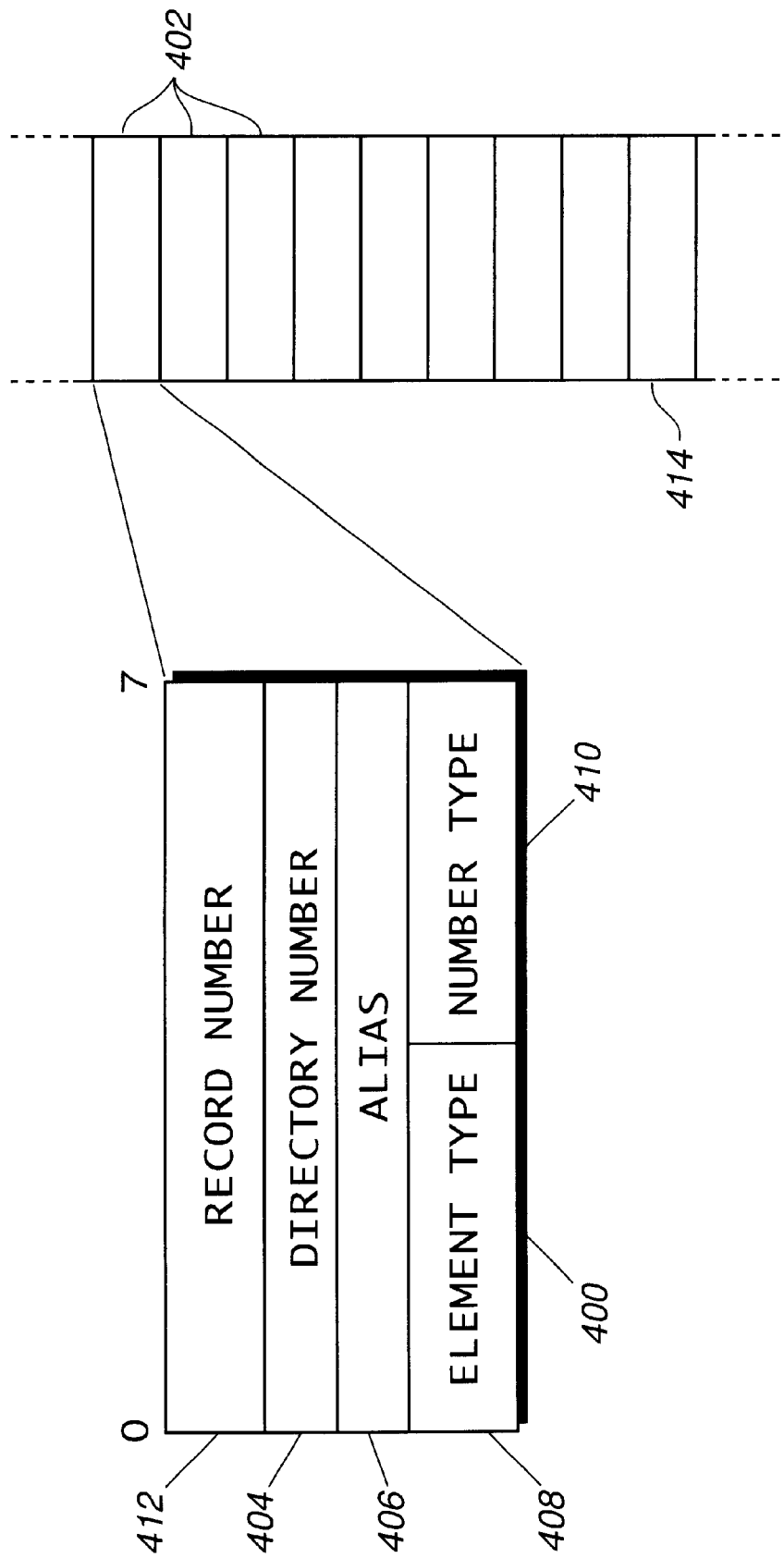
FIG. 4 shows a representation of an information record in a memory location, in accordance with the instant invention.

Referring now to FIG. 4, there is shown therein a representation of an information record 400 in a memory location 402, in accordance with the instant invention. The information record shown here is in accordance with a phone number/dialing string/directory number type of record. Each component of the information record is a personality parameter. Although there are numerous ways to format the information, each record will comprise the personality parameters of a directory number 404, an alias 406, an element type 408, and a number type 410.

The directory number is the string of digits the mobile station will call. The alias is an alpha-numeric string the user puts into the mobile station, by the user interface, which is then displayed to remind the user of the significance of the number. The element type indicates whether the number is a fixed or variable personality parameter. The number type 410 indicates what type of number the directory number is, such as whether the number is a telephone exchange number, a trunked radio ID number, or a private dispatch number for a networked dispatch radio system. If the records are of variable lengths in memory the record may included a record number 412, which is prefaced by a predetermined string to indicate the beginning of a new record, and may contain a key used by the central office for determining the current system parameter to be used for the variable personality parameter.

The memory also may comprise a memory map 414 which is used to keep track of which records in memory contain variable personality parameters. Upon the occurrence of the condition used to initiate an update of the personality parameters, the mobile station controller will access the memory map to locate the memory locations or record numbers of those records having variable personality parameters. The controller will then retrieve either the key from the record number, or the alias to be used as a key, and transmit them to the fixed equipment network along with an update request.

In practicing the invention, it is contemplated that other types of information, in addition to directory numbers, may be set up as variable personality parameters. Examples of other information that may be so kept includes scan list variables and channel list variables. A scan list variable is a list of preferred frequencies, while a channel list variable indicates a preferred control channel on a given frequency. This type of information is useful for a user who frequently travels to various geographic regions.

Upon entering a new geographic region, typically, upon powering up, the mobile station will scan a stored preferred frequency list. The entries in the preferred frequency list are derived from operation in the previous geographic region, and may not be valid frequencies in the present geographic region. If no signal is found on any of the preferred frequencies, a prior art mobile station will then begin a comprehensive scan of all possible operating frequencies to find on at which the user's service provider is operating. This process is time consuming, and it can be several minutes before a valid frequency is found.

The present invention can avoid this problem by setting a scan list up as a variable personality parameter. Upon entering the new region, the mobile station would request a personality update. Directory numbers and dialing strings can be updated, as well as the scan and channel lists, at that time. Having received the local system operator's preferred operating frequencies, the time necessary to register the mobile station afterwards will be significantly reduced.

The manner in which variable personality parameters is updated can be executed in two ways. It can be an automatic event that occurs during registration, or it can be performed during operation after registration upon a request by the user. The use of variable personality parameters allows a user to always have the right dialing string, directory number, or radio number of the organization the user needs to communicate with, and relieves the user of having to know who in particular is on call, or what the specific number in the present geographic region is in order to make communicate. The invention can be used to automatically load the phone numbers for local police, sales organizations, and so on, for both private and public organizations between geographic regions. Within a geographic region the invention can be used to automatically update calling information for on call personnel that may change during the day.

In summary, the present invention allows a user to store a record in a mobile station the has a dynamic personality parameter. The variable personality parameter may change by virtue of the time of day, or by virtue of a change in geographic region. The system operator maintains a database of dynamic parameters, each having at least a current system parameter. In the case of a dynamic directory number for a particular organization, the current system parameter changes at appropriate times so that the directory number of the person who is presently on duty within that organization is given in response to all requests from mobile stations. Each requesting mobile station then stores and associates the current system parameter with the appropriate alias. In making the request, the mobile station sends in some indicator to the system to identify what parameter needs updating. The identifier can be a unique key assigned by the system operator, or a unique alias. In either case, the mobile station users who wish to use the parameter, and have it updated automatically, must obtain the unique key or alias from the system operator and program it into the mobile station. Furthermore, other types of information may be so updated, such as scan and channel lists, and the update may occur at the time of registration with the fixed equipment network, or upon a request by the user at any time subsequent to registration.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for updating a mobile station personality of a mobile station from a fixed equipment network, comprising:

requesting a personality update by the mobile station, including indicating a variable personality parameter to be updated;

searching a database of variable system parameters to find a current system parameter corresponding to the variable personality parameter, the database being part of the fixed equipment network;

transmitting to the mobile station the current system parameter corresponding to the variable personality parameter;

storing the current system parameter in the mobile station in a memory location of a local personality database corresponding to the variable personality parameter; and referring to the variable personality parameter with a fixed alias;

wherein the requesting is performed upon a request by a user of the mobile station and the searching and transmitting are performed automatically.

2. A method for updating as defined by claim 1, wherein the requesting is performed during a registration procedure.

3. A method for updating as defined in claim 1, wherein the variable personality parameter to be updated is a call list variable.

4. A method for updating as defined in claim 1, wherein the variable personality parameter to be updated is a scan list variable.

5. A method for updating as defined in claim 1, wherein the variable personality parameter to be updated is a channel list variable.

6. A mobile communication system, comprising:

a fixed equipment network, comprising:

a base station for establishing a serving cell;

a central office operably coupled to the base station and having a database for storing variable system parameters; and a mobile station having a memory, a local personality database stored in the memory, the local personality database including at least one fixed personality parameter and at least one variable personality parameter;

wherein the at least one variable personality parameter is updated by requesting and receiving from the fixed equipment network at least one current system parameter corresponding to the at least one variable personality parameter, and said requesting is performed without regard to geographic location.

7. A mobile communication system as defined in claim 6, wherein the at least one variable personality parameter includes a call list variable.

8. A mobile communication system as defined in claim 6, wherein the at least one variable personality parameter includes a scan list variable.

9. A mobile communication system as defined in claim 6, wherein the at least one variable personality parameter includes a channel list variable.

10. A method for updating a mobile station personality of a mobile station from a fixed equipment network, comprising:

requesting a personality update by the mobile station, including indicating a variable personality parameter to be updated;

searching a database of variable system parameters to find a current system parameter corresponding to the variable personality parameter, the database being part of the fixed equipment network;

transmitting to the mobile station the current system parameter corresponding to the variable personality parameter;

storing the current system parameter in the mobile station in a memory location of a local personality database corresponding to the variable personality parameter; and referring to the variable personality parameter with a fixed alias;

wherein the requesting is performed periodically without regard for geographic location.

11. A method for updating a mobile station personality of a mobile station from a fixed equipment network, comprising:

requesting a personality update by the mobile station, including indicating a variable personality parameter to be updated;

searching a database of variable system parameters to find a current system parameter corresponding to the variable personality parameter, the database being part of the fixed equipment network;

transmitting to the mobile station the current system parameter corresponding to the variable personality parameter;

storing the current system parameter in the mobile station in a memory location of a local personality database corresponding to the variable personality parameter; and referring to the variable personality parameter with a fixed alias;

wherein the requesting is performed according to a schedule, and without regard to geographic location.

* * * * *